(12) United States Patent
Takeda et al.

(10) Patent No.: US 11,115,174 B2
(45) Date of Patent: Sep. 7, 2021

(54) BASE STATION, USER TERMINAL, RADIO COMMUNICATION SYSTEM, AND COMMUNICATION CONTROL METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/317,570

(22) PCT Filed: Apr. 23, 2015

(86) PCT No.: PCT/JP2015/062324
§ 371 (c)(1),
(2) Date: Dec. 9, 2016

(87) PCT Pub. No.: WO2016/002323
PCT Pub. Date: Jan. 7, 2016

(65) Prior Publication Data
US 2017/0141907 A1    May 18, 2017

(30) Foreign Application Priority Data

Jul. 1, 2014 (JP) .............................. JP2014-135614

(51) Int. Cl.
*H04L 5/14* (2006.01)
*H04L 5/00* (2006.01)
(Continued)

(52) U.S. Cl.
CPC ............. *H04L 5/14* (2013.01); *H04B 7/2656* (2013.01); *H04L 5/005* (2013.01); *H04L 5/0051* (2013.01);
(Continued)

(58) Field of Classification Search
CPC ... H04B 1/56; H04B 7/2656; H04W 72/0446; H04W 88/08; H04W 76/02
See application file for complete search history.

(56) References Cited

U.S. PATENT DOCUMENTS 6,385,638 B1 * 5/2002 Baker-Harvey ...... G06F 9/4881
718/107
7,873,074 B1 * 1/2011 Boland .................. H04L 47/823
370/468
(Continued)

FOREIGN PATENT DOCUMENTS

EP          2908586 A1      8/2015
SE    WO 2014/079052 A1 * 11/2012 ............ H04W 24/08
(Continued)

OTHER PUBLICATIONS

International Search Report issued in PCT/JP2015/062324 dated Jul. 28, 2015 (2 pages).
(Continued)

*Primary Examiner* — Peter G Solinsky
*Assistant Examiner* — Sanjay K Dewan
(74) *Attorney, Agent, or Firm* — Osha Bergman Watanabe & Burton LLP

(57) ABSTRACT

A radio communication system includes one or more user terminals and one or more base stations that execute time division radio communication using a time division duplex (TDD) system. A radio frame is a radio communication resource used in the time division radio communication, and includes a downlink subframe that is a transmission period of a downlink signal, a special subframe including a guard period that is used neither for transmission of a downlink signal nor for transmission of an uplink signal, and an extended subframe that is used as either a transmission period of a downlink signal or a transmission period of an
(Continued)

uplink signal, in accordance with a scheduling by the base station.

4 Claims, 8 Drawing Sheets

(51) Int. Cl.
*H04W 72/12* (2009.01)
*H04B 7/26* (2006.01)

(52) U.S. Cl.
CPC ....... *H04L 5/1469* (2013.01); *H04W 72/1268* (2013.01); *H04L 5/0044* (2013.01); *Y02D 30/70* (2020.08)

(56) References Cited

U.S. PATENT DOCUMENTS

| | | | | |
|---|---|---|---|---|
| 8,050,208 B2* | 11/2011 | Jung | ................ | H04W 52/0216 370/311 |
| 8,285,346 B2* | 10/2012 | Fodor | ................ | H04W 52/0216 455/574 |
| 8,437,285 B2* | 5/2013 | Jokimies | ........... | H04W 52/0274 370/278 |
| 9,549,395 B2* | 1/2017 | Lee | ..................... | H04W 72/042 |
| 9,621,328 B2* | 4/2017 | Takano | ............... | H04W 72/042 |
| 10,085,257 B2* | 9/2018 | Oizumi | ................... | H04L 5/001 |
| 2003/0026215 A1* | 2/2003 | Schafer | ............... | H04B 7/2656 370/280 |
| 2005/0044191 A1* | 2/2005 | Kamada | ............ | G06Q 30/0645 709/223 |
| 2008/0186892 A1* | 8/2008 | Damnjanovic | ... | H04W 52/0216 370/311 |
| 2008/0268845 A1* | 10/2008 | Wu | ..................... | H04W 76/048 455/436 |
| 2009/0168714 A1* | 7/2009 | Tanaka | .................. | H04L 1/1671 370/329 |
| 2011/0149813 A1 | 6/2011 | Parkvall et al. | | |
| 2013/0194980 A1* | 8/2013 | Yin | ........................ | H04L 1/1607 370/280 |
| 2013/0322378 A1* | 12/2013 | Guan | ................ | H04W 72/1268 370/329 |
| 2014/0010128 A1* | 1/2014 | He | ........................ | H04L 1/1812 370/280 |
| 2014/0086112 A1* | 3/2014 | Stern-Berkowitz | ......................... H04W 72/1289 370/280 | |
| 2014/0092785 A1* | 4/2014 | Song | ................. | H04W 28/0278 370/280 |
| 2014/0133369 A1 | 5/2014 | Cheng et al. | | |
| 2014/0307598 A1* | 10/2014 | Mizusawa | ......... | H04W 72/0446 370/280 |
| 2014/0328229 A1* | 11/2014 | Ahn | .................. | H04W 56/0005 370/280 |
| 2015/0016318 A1* | 1/2015 | Lee | ........................... | H04L 5/14 370/280 |
| 2015/0043396 A1* | 2/2015 | Ekpenyong | ........... | H04L 5/1469 370/280 |
| 2015/0124664 A1* | 5/2015 | Park | ...................... | H04L 5/0092 370/280 |
| 2015/0200752 A1* | 7/2015 | Yin | ....................... | H04L 5/1469 370/280 |
| 2015/0295743 A1* | 10/2015 | Hwang | ................. | H04W 48/12 370/280 |
| 2015/0296509 A1 | 10/2015 | Yang et al. | | |
| 2015/0304087 A1* | 10/2015 | He | ....................... | H04B 7/0617 370/280 |
| 2015/0373675 A1* | 12/2015 | Seo | ..................... | H04W 72/042 370/280 |
| 2016/0080133 A1* | 3/2016 | Golitschek Edler von Elbwart ... H04W 72/0446 370/280 | | |
| 2016/0081020 A1* | 3/2016 | Rahman | ............ | H04W 52/0209 370/311 |
| 2016/0119971 A1* | 4/2016 | Bachu | ................... | H04W 76/00 370/328 |
| 2016/0124765 A1* | 5/2016 | Kaneko | ............... | G06F 9/45533 718/1 |
| 2016/0381681 A1* | 12/2016 | Nogami | ................ | H04W 24/10 370/280 |
| 2018/0027581 A1* | 1/2018 | Khoryaev | ......... | H04W 72/1263 370/280 |
| 2018/0115986 A1* | 4/2018 | Aiba | ................. | H04W 72/1278 |
| 2018/0192409 A1* | 7/2018 | Yang | ................... | H04W 72/044 |
| 2019/0297028 A1* | 9/2019 | Zhao | ..................... | H04L 47/783 |

FOREIGN PATENT DOCUMENTS

| | | |
|---|---|---|
| WO | 2013172473 A1 | 11/2013 |
| WO | 2014/067140 A1 | 5/2014 |
| WO | 2014/069105 A1 | 5/2014 |
| WO | 2014/079052 A1 | 5/2014 |
| WO | 2014/081241 A1 | 5/2014 |

OTHER PUBLICATIONS

Written Opinion of the International Searching Authority issued in PCT/JP2015/062324 dated Jul. 28, 2015 (4 pages).

Intel Corporation; Discussion on Remaining Details of UL PC for eIMTA Support; 3GPP TSG RAN WG1 #75 Meeting, R1-135098; San Francisco, USA; Nov. 11-15, 2013 (5 pages).

3GPP TS 36.211 V12.1.0; "3rd Generation Partnership Project; Technical Specification Group Radio Access Network; Evolved Universal Terrestrial Radio Access (E-UTRA); Physical channels and modulation (Release 12)"; Mar. 2014 (120 pages).

3GPP TS 36.321 V12.1.0; "3rd Generation Partnership Project; Technical Specification Group Radio Access Network; Evolved Universal Terrestrial Radio Access (E-UTRA); Medium Access Control (MAC) protocol specification (Release 12)"; Mar. 2014 (57 pages).

Extended European Search Report issued in corresponding European Application No. 15815237.1, dated May 29, 2017 (8 pages).

Office Action issued in counterpart Japanese Patent Application No. 2016-531164, dated Apr. 16, 2019 (4 pages).

Office Action issued in Japanese Application No. 2019-214349; dated Feb. 2, 2021 (6 pages)

Office Action issued in the counterpart Japanese Patent Application No. 2019-214349, dated Jun. 15, 2021 (5 pages).

* cited by examiner

FIG. 3
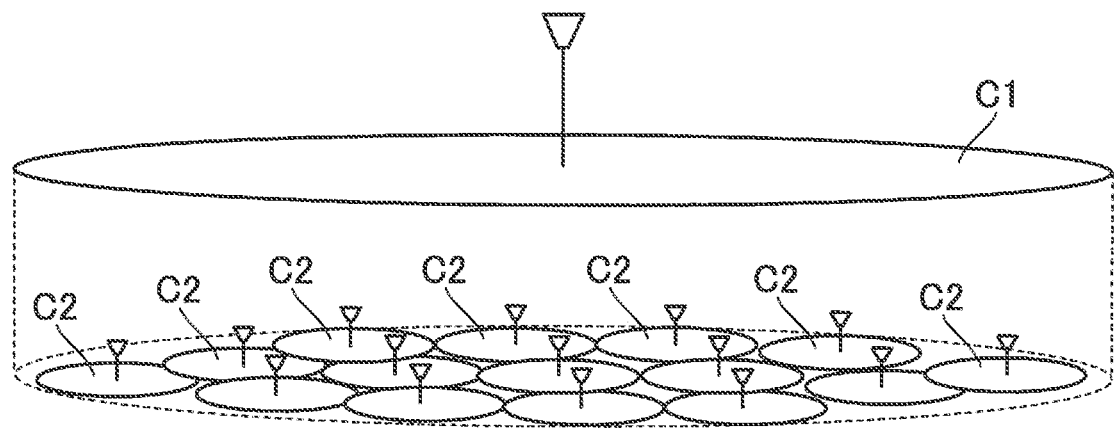
FIG. 4
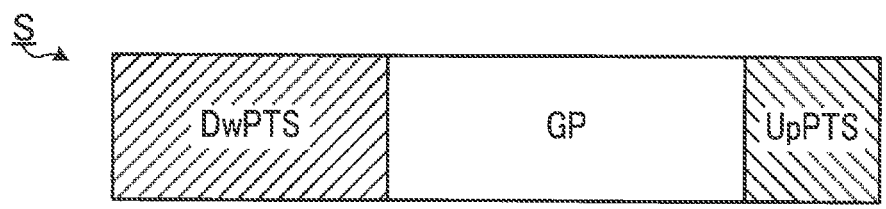
FIG. 5
| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 7 | D | D | D | D | D | D | D | D | D | D |

| UL/DL CONFIGURA-TION | SWITCHING PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | E | E | E | D | S | E | E | E |
| 1 | 5 ms | D | S | E | E | D | D | S | E | E | D |
| 2 | 5 ms | D | S | E | D | D | D | S | E | D | D |
| 3 | 10 ms | D | S | E | E | E | D | D | D | D | D |
| 4 | 10 ms | D | S | E | E | D | D | D | D | D | D |
| 5 | 10 ms | D | S | E | D | D | D | D | D | D | D |
| 6 | 5 ms | D | S | E | E | E | D | S | E | E | D |

EXTENDED SUBFRAME

BASE STATION, USER TERMINAL, RADIO COMMUNICATION SYSTEM, AND COMMUNICATION CONTROL METHOD

TECHNICAL FIELD

The present invention relates to a base station, a user terminal, a radio communication system, and a communication control method.

BACKGROUND ART

The LTE (Long Term Evolution) standard, a cellular radio communication standard, defines FD-LTE, in which frequency division duplex is executed using different frequency bands for uplinks and downlinks, and TD-LTE, in which time division duplex is executed using a common frequency band for uplinks and downlinks.

In TD-LTE, communication is performed by switching between uplink communication and downlink communication in units of subframes. More specifically, downlink communication or uplink communication is scheduled for each subframe based on the configuration information (UL-DL configuration) that defines, for each of the subframes included in a radio frame, whether the subject subframe is an uplink communication subframe or a downlink communication subframe. The standard defines seven different UL-DL configurations for the radio frame (FIG. 1, Non-Patent Document 1).

A radio base station periodically transmits system information including the UL-DL configuration of the cell through PDSCH in its TD-LTE serving cell. A user terminal receives the system information, and learns the UL-DL configuration of the TD-LTE serving cell. In a case where the TD-LTE serving cell is configured for the user terminal as a secondary cell in carrier aggregation, the user terminal may not receive the system information. Accordingly, in such a case, the radio base station notifies the user terminal of the UL-DL configuration of the cell by higher layer signaling such as user-specific RRC.

In FIG. 1, "D" denotes a DL (Downlink) subframe to be used for downlink communication, "U" denotes an UL (Uplink) subframe used for uplink communication, and "S" denotes an SP (Special) subframe including a gap period. As shown in FIG. 1, the subframe ratio between the uplinks and the downlinks may differ depending on the UL-DL configuration.

RELATED ART DOCUMENT

Non-Patent Documents

Non-Patent Document 1: 3GPP TS 36.211 V12.1.0 (2014-03), 3rd Generation Partnership Project; Technical Specification Group Radio Access Network; Evolved Universal Terrestrial Radio Access (E-UTRA); Physical channels and modulation (Release 12)

Non-Patent Document 2: 3GPP TS 36.321 V12.1.0 (2014-03), 3rd Generation Partnership Project; Technical Specification Group Radio Access Network; Evolved Universal Terrestrial Radio Access (E-UTRA); Medium Access Control (MAC) protocol specification (Release 12)

SUMMARY OF THE INVENTION

Problem to be Solved by the Invention

Due to the increase in the volume of web content and the improvement of the performance of mobile terminals such as smartphones in recent years, traffic has greatly increased in cellular radio communication systems (mobile phone networks). In a cellular radio communication system, generally, the downlink traffic volume is markedly larger than the uplink traffic volume. For example, in a hot spot such as a train station that is crowded with people, the downlink traffic volume may become ten times or more of the uplink traffic volume. Accordingly, it is understood that in order to process such traffic, the radio resources should be appropriately allocated to uplinks and downlinks.

As described above, the ratio between the uplink subframes and the downlink subframes can be changed by switching the UL-DL configuration in the conventional technology. However, flexible switching is difficult because notification to a user terminal must be made using the system information included in PDSCH or higher layer signaling in order to switch the UL-DL configuration.

In consideration of the above circumstances, an object of the present invention is to flexibly allocate radio resources between uplink communication and downlink communication in time division duplex.

Means of Solving the Problems

A base station of the present invention is a base station that executes time division radio communication with a user terminal, using a time division duplex (TDD) system. A radio frame, which is a radio communication resource used in the time division radio communication, includes a downlink subframe that is a transmission period of a downlink signal, a special subframe including a guard period that is used neither for transmission of a downlink signal nor for transmission of an uplink signal, and an extended subframe that is used as either a transmission period of a downlink signal or a transmission period of an uplink signal, in accordance with a scheduling by the base station.

A user terminal of the present invention is a user terminal that executes time division radio communication with a base station, using a time division duplex (TDD) system. A radio frame, which is a radio communication resource used in the time division radio communication, includes a downlink subframe that is a transmission period of a downlink signal, a special subframe including a guard period that is used neither for transmission of a downlink signal nor for transmission of an uplink signal, and an extended subframe that is used as either a transmission period of a downlink signal or a transmission period of an uplink signal, in accordance with a scheduling by the base station.

A radio communication system of the present invention includes one or more user terminals and one or more base stations that execute time division radio communication using a time division duplex (TDD) system. A radio frame, which is a radio communication resource used in the time division radio communication, includes a downlink subframe that is a transmission period of a downlink signal, a special subframe including a guard period that is used neither for transmission of a downlink signal nor for transmission of an uplink signal, and an extended subframe that is used as either a transmission period of a downlink signal or a transmission period of an uplink signal, in accordance with a scheduling by the base station.

A communication control method of the present invention is a communication control method in a radio communication system that includes one or more user terminals and one or more base stations that execute time division radio communication using a time division duplex (TDD) system. A radio frame, which is a radio communication resource used in the time division radio communication, includes a downlink subframe that is a transmission period of a downlink signal, a special subframe including a guard period that is used neither for transmission of a downlink signal nor for transmission of an uplink signal, and an extended subframe that is used as either a transmission period of a downlink signal or a transmission period of an uplink signal, in accordance with a scheduling by the base station.

Effect of the Invention

According to the present invention, it is possible to flexibly allocate radio resources between uplink communication and downlink communication in time division duplex.

BRIEF DESCRIPTION OF THE DRAWINGS

FIG. 3 is a diagram illustrating examples of cells that base stations form around themselves.

FIG. 4 is a diagram illustrating a configuration of a special subframe.

FIG. 5 is a diagram illustrating an example of new UL-DL configurations.

MODES FOR CARRYING OUT THE INVENTION

In the following, embodiments of the present invention will be described in detail with reference to the drawings.

1. First Embodiment

1(1). Outline of Cellular Radio Communication System

Figure 2:
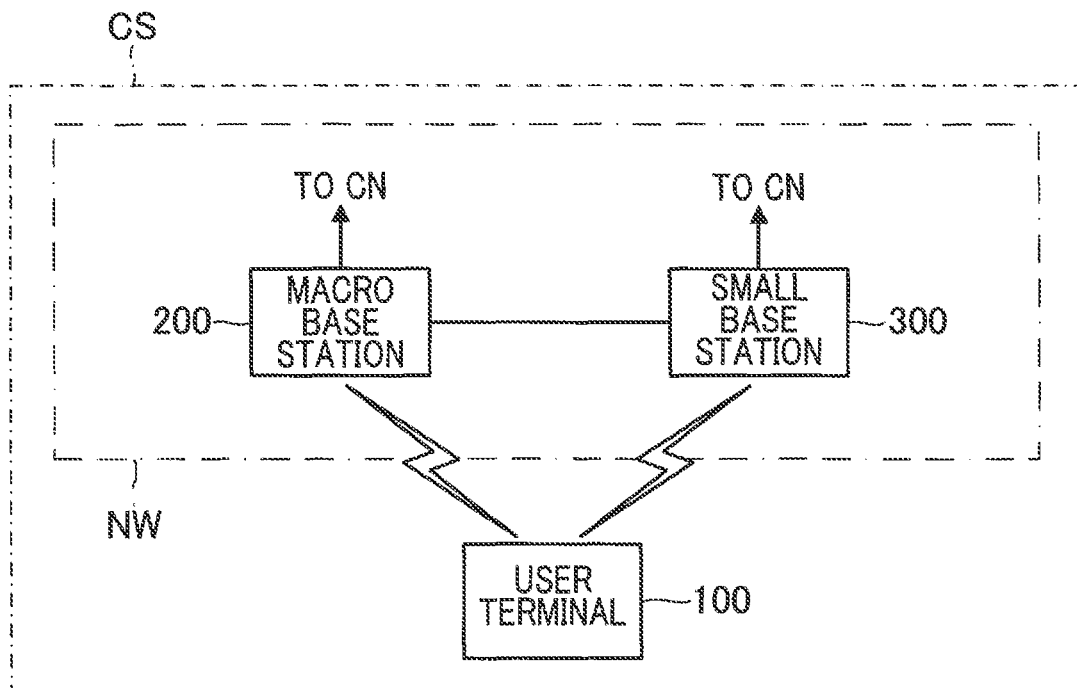
FIG. 2 is a schematic diagram illustrating a cellular radio communication system of a first embodiment.

FIG. 2 is a schematic diagram illustrating a cellular radio communication system CS according to a first embodiment of the present invention. The cellular radio communication system CS includes a user terminal 100, a macro base station 200, and a small base station 300. The macro base station 200 and the small base station 300 are connected to a core network CN (not shown) that includes a switching station and a gateway. The small base station 300 may be connected to the core network via the macro base station 200 instead of being directly connected to the core network CN. A network NW comprises, among the above-described elements included in the cellular radio communication system CS, the elements other than the user terminal 100.

The user terminal 100 executes radio communication with the macro base station 200 and the small base station 300 in a time division duplex scheme, in accordance with a cellular radio communication standard such as the LTE, which is defined in the 3GPP standards. The user terminal 100 may execute radio communication through time division duplex in different frequency bands in parallel, or may execute radio communication through time division duplex and radio communication through frequency division duplex in different frequency bands in parallel. For example, the user terminal 100 may communicate with the small base station 300 through time division duplex in one frequency band, and at the same time communicate with the macro base station 200 through frequency division duplex in another frequency band.

Each base station eNB (macro base station 200 or small base station 300) is identified by a physical cell identifier PCI (cell-specific reference signal) that is specific to a cell C formed by the base station eNB. As will be described later, one or more base stations eNB (preferably two or more base stations eNB) may be identified by a single virtual cell identifier VCID.

The macro base station 200 and the small base station 300 are connected to each other by a wired interface, such as an optical fiber, through which a clock signal can be transmitted. The macro base station 200 and the small base station 300 can be synchronized to each other according to the clock signal. The clock signal may be generated in one of the base stations (preferably, in the macro base station 200), to be transmitted to other base stations eNB, or may be generated in a clock generator (not shown) that is arranged separately from the base stations eNB, to be transmitted to the base stations eNB.

FIG. 3 is a diagram illustrating examples of cells C that the base stations eNB form around themselves. Each cell C has a range in which a radio wave from the corresponding base station eNB effectively reaches the user terminal 100. The macro base station 200 forms a macro cell C1 around itself; and each of the small base stations 300 forms a small cell C2 around itself. Antennas of the base stations eNB are schematically illustrated at the centers of the respective cells C. Although the plane on which the macro cell C1 is illustrated and the plane on which the small cells C2 are illustrated are drawn separately for convenience of drawing, in actuality, the macro cell C1 and the small cells C2 are overlapped on the same plane (such as the surface of the earth).

1(2). Radio Communication Resource (Subframe)

Figure 1:
FIG. 1 is a diagram illustrating UL-DL configurations of a radio frame.

As described above, radio frames F are used as the radio communication resources in radio communication through time division duplex. Each node (such as user terminal 100, macro base station 200, or small base station 300) transmits various radio signals (e.g., reference signals and user signals) on the radio frames F. A single radio frame F includes ten subframes SF. The time length of each subframe SF is 1 ms, and the time length of a single radio frame F is 10 ms. As shown in FIG. 1, subframe numbers #0 to #9 are given to the respective subframes SF in the order of transmission.

Types of subframes used in radio communication through time division duplex will be described. A downlink subframe D (DL subframe), an uplink subframe U (UL subframe), and a special subframe S (SP subframe) are used, as described above.

In the downlink subframes D, the base station eNB (macro base station 200 or small base station 300) transmits downlink radio signals (control signals and data signals) to the user terminal 100. The user terminal 100 is capable of performing operations, such as a measuring operation of downlink reception power or the like (measurement), a mobility control operation, a measuring operation of channel state information (CSI), and a receiving operation of downlink data, during the downlink subframes D. The downlink data is received at the user terminal 100 in accordance with a control signal that is contained in the same downlink subframe D as that containing the data signal to be received.

In the uplink subframes U, the user terminal 100 transmits uplink radio signals (control signals and data signals) to the base station eNB (macro base station 200 or small base station 300). The user terminal 100 can transmit a sounding reference signal (SRS), a physical random access channel (PRACH) signal, uplink data, and the like in the uplink subframes U. The uplink data is transmitted by the user terminal 100 in accordance with a control signal that is contained in a downlink subframe D (e.g., the fourth subframe) before the uplink subframe U in which the data signal to be transmitted should be contained.

As shown in FIG. 4, the special subframe S comprises a downlink pilot time slot (DwPTS) in which a downlink signal is transmitted, a guard period (GP) which is used for neither transmission of a downlink signal nor transmission of an uplink signal, and an uplink pilot time slot (UpPTS) in which an uplink signal is transmitted. The special subframe S is located where the downlink subframe D is switched to the uplink subframe U (that is, located after the downlink subframe D and before the uplink subframe U). The base station eNB (macro base station 200 or small base station 300) can transmit downlink control signals and data signals in DwPTSs, as in the downlink subframes D. The user terminal 100 can receive downlink control signals and data signals in DwPTSs. Also, in UpPTSs, the user terminal 100 can transmit uplink sounding reference signals and/or physical random access channel signals, but it does not transmit uplink data signals.

1(3). Technical Problem

As is understood from FIG. 1, each conventional UL-DL configuration (#0 to #6) includes both the downlink subframe D and the uplink subframe U. As described above, in the current cellular radio communication system CS, increase in downlink traffic is a problem. When the transmission amount of downlink signals is large and the transmission amount of uplink signals is small in the cellular radio communication system CS, a case is envisioned where the number of uplink subframes U is excessive while the number of downlink subframes D is insufficient. In such a case, the radio resources allocated to the uplinks would not be effectively used but would be wasted.

Figure 6:
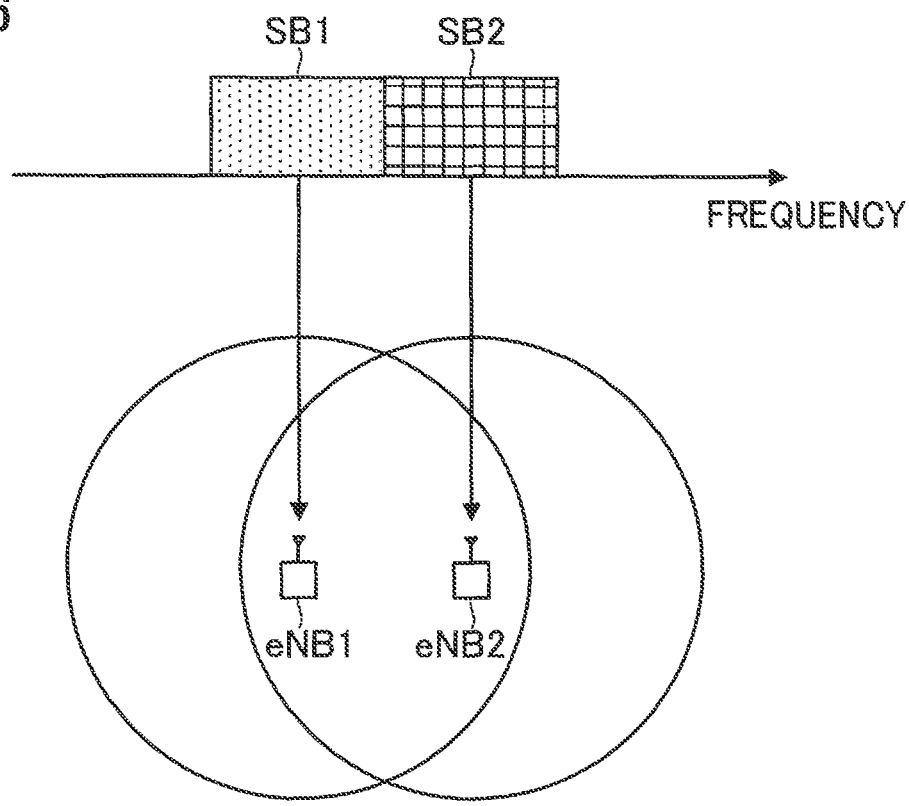
FIG. 6 is a diagram illustrating adjacent base stations and adjacent subbands.

In order to resolve the above problem, in addition to the conventional UL-DL configurations, one may assume a configuration that employs an UL-DL configuration #7 having all the subframes SF being configured as the downlink subframes D, as shown in FIG. 5. Since none of the subframes is an uplink subframe U in the UL-DL configuration #7, uplink control signals, random access channel signals, or the like cannot be transmitted. Accordingly, carrier aggregation, in which communication is performed simultaneously with a serving cell that uses a different frequency band, is conceivable as a use case of the UL-DL configuration #7. In this case, if an uplink subframe U exists in the subframes used for the serving cell that uses the different frequency band, then the necessary uplink signals can be transmitted. However, as shown in FIG. 6, if subbands SB (SB1 and SB2) of frequency bands whose frequencies are the same or close are allocated to base stations eNB (eNB1 and eNB2) that are geographically close in a cellular radio communication system CS that adopts carrier aggregation, a new problem such as follows may possibly arise.

Figure 7:
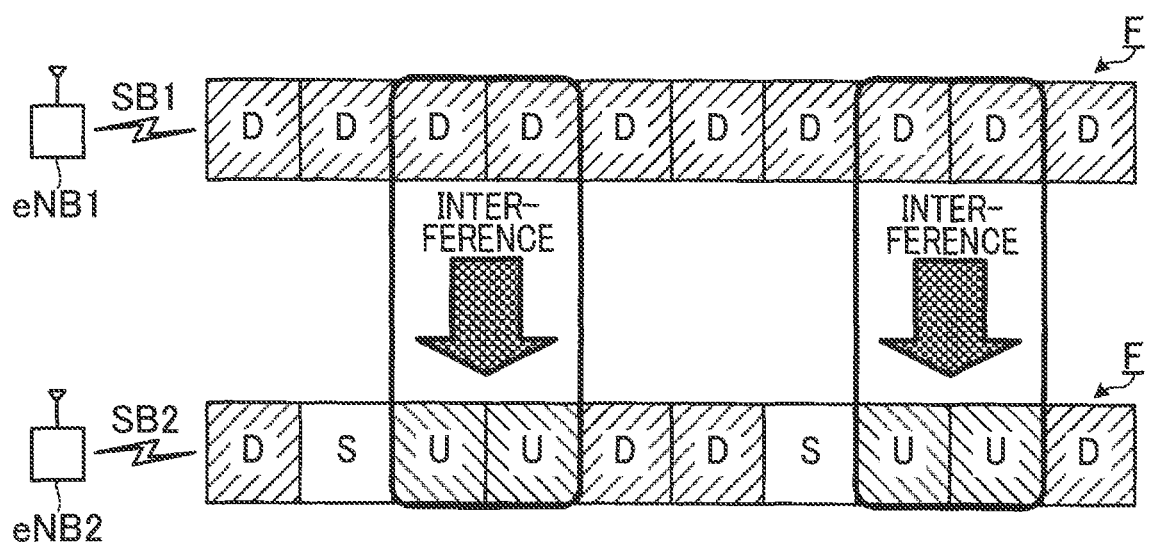
FIG. 7 is a diagram describing interference that occurs between subbands.

That is, as shown in FIG. 7, when the base station eNB1 transmits radio frames F (downlink subframes D) according to the UL-DL configuration #7 in the first subband SB1, strong interference is imparted to all the uplink subframes U that are transmitted from the base station eNB2 in the neighboring second subband SB2. This is because generally the downlink transmission power (e.g., 30 dBm or 46 dBm) is stronger than the uplink transmission power (e.g., 23 dBm).

This interference is a very serious problem in a case where the geographically neighboring base stations eNB belong to different carriers, because the system performance of one or the other of the carriers will be degraded. In order to solve the aforementioned problem, the UL-DL configurations of the carriers that use TD-LTE in a way interference may be imparted to each other are configured to be identical or such that the interference is tolerable. Also, even in a case where the operation of another carrier is not adversely influenced, the UL-DL configurations are configured to be identical or such that interference is tolerable between the neighboring base stations eNB of the same carrier in order to prevent the system performance from being degraded. Thus, considering the need to avoid interference between the neighboring base stations eNB, it is difficult to actually change the usage of subframes SF (types of D, U, and S) flexibly in response to the rapid change in traffic volume.

In order to solve various technical problems including the problem relating to the UL-DL configuration illustrated above, various communication control methods that use new extended subframes E (EX subframes) will be proposed in the present application. An extended subframe E is a radio resource that is used for either uplink communication or downlink communication in accordance with control (described later) by the base station eNB.

Figure 8:
FIG. 8 is a diagram illustrating an example of new UL-DL configurations including extended subframes.

FIG. 8 illustrates an example of new UL-DL configurations (hereinafter referred to as "extended UL-DL configurations") including such extended subframes E. A configuration and an operation relating to a cellular radio communication using extended sub frames E will now be described. In the following description, we assume that the user terminal 100 uses the macro cell C1 as a primary cell (PCell) and uses the small cell C2 as a secondary cell (SCell). We also assume that the small cell C2 (small base station 300) that serves as the secondary cell for the user terminal 100 supports the extended subframe E.

1(4). Configuration of Elements

1(4)-1. Configuration of User Terminal

Figure 9:
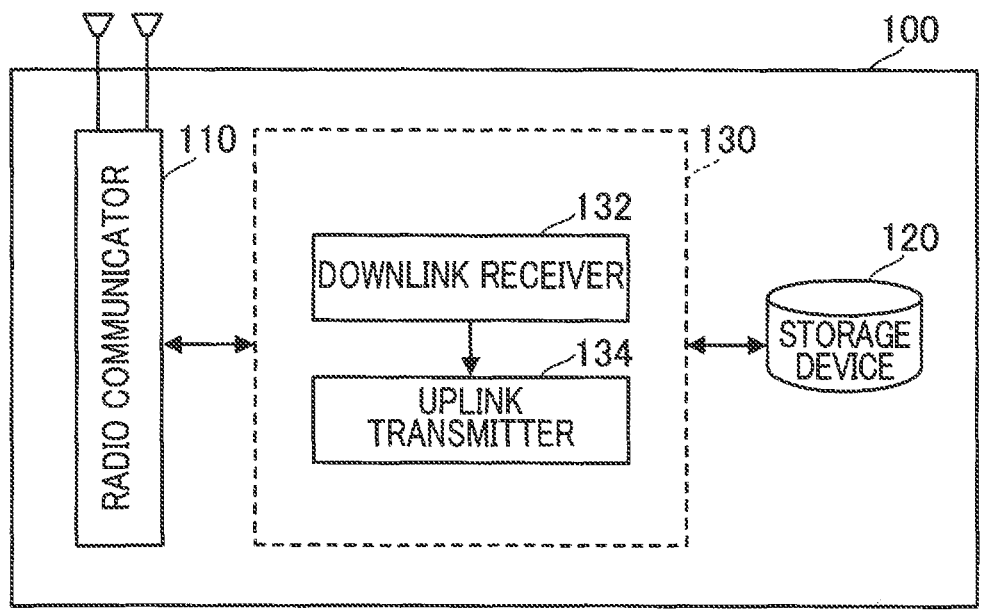
FIG. 9 is a block diagram showing a configuration of a user terminal according to the first embodiment.

FIG. 9 is a block diagram showing a configuration of the user terminal 100 according to the first embodiment. The user terminal 100 includes a radio communicator 110, a storage device 120, and a controller 130. Illustration of an output device, an input device, and the like for outputting sound, a picture, and the like and receiving an instruction from a user is omitted for convenience. The radio communicator 110 is an element for executing radio communication with the macro base station 200 and the small base station 300, and includes a transmission/reception antenna, a reception circuit that receives a radio signal (radio wave) and converts the radio signal to an electric signal, and a transmission circuit that converts an electric signal such as a control signal or a user signal to a radio signal (radio wave) and transmits the radio signal. The storage device 120 stores information relating to communication control and a later-described computer program.

The controller 130 includes a downlink receiver 132 and an uplink transmitter 134. The downlink receiver 132 executes a downlink reception operation according to a control signal transmitted from the base station eNB. Similarly, the uplink transmitter 134 executes an uplink transmission operation according to a control signal transmitted from the base station eNB. The controller 130 and the elements in the controller 130 are functional blocks that are realized by a CPU (Central Processing Unit) in the user terminal 100 executing the computer program stored in the storage device 120 and functioning in accordance with the computer program.

1(4)-2. Configuration of Macro Base Station

Figure 10:
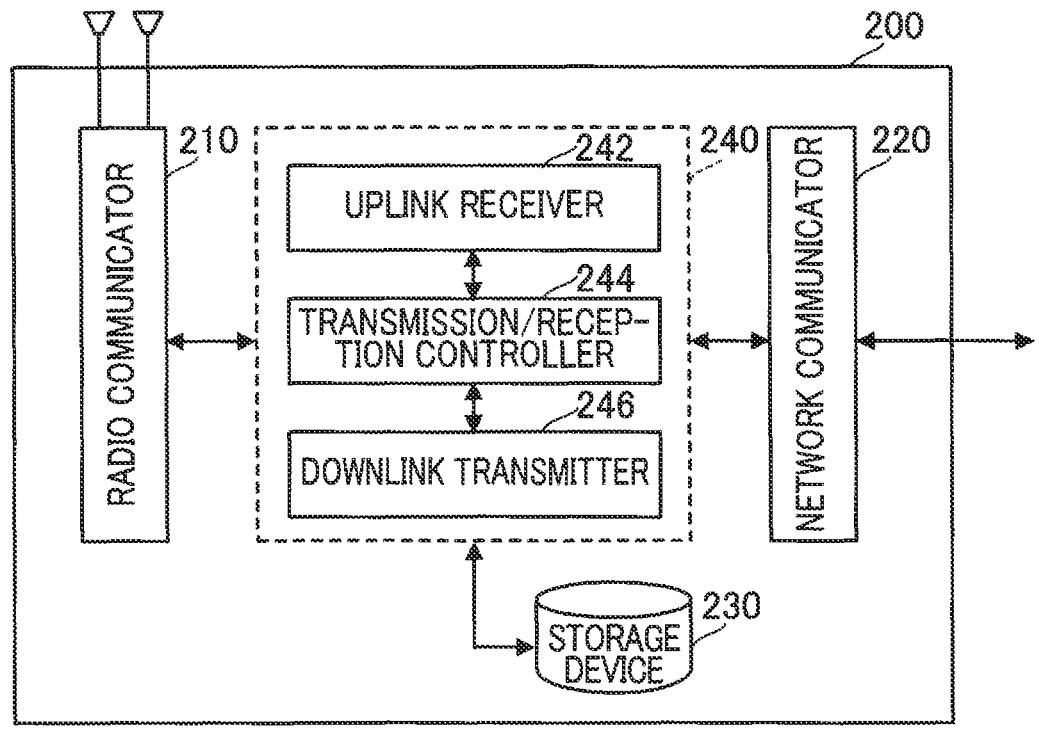
FIG. 10 is a block diagram showing a configuration of a macro base station according to the first embodiment.

FIG. 10 is a block diagram showing a configuration of the macro base station 200 according to the first embodiment. The macro base station 200 includes a radio communicator 210, a network communicator 220, a storage device 230, and a controller 240. The radio communicator 210 is an element for executing radio communication with the user terminal 100 and includes a transmission/reception antenna, a reception circuit, and a transmission circuit. The network communicator 220 is an element for executing communication with other nodes in the network NW, including the small base station 300, and transmits and receives signals to and from other nodes. The storage device 230 stores information relating to communication control and a later-described computer program.

The controller 240 includes an uplink receiver 242, a transmission/reception controller 244, and a downlink transmitter 246. The uplink receiver 242 receives uplink signals transmitted from the user terminal 100. The transmission/reception controller 244 executes scheduling of uplink communication and downlink communication and performs overall control on the radio communication performed by the user terminal 100, the macro base station 200, and the small base station 300. The downlink transmitter 246 transmits downlink signals to the user terminal 100. The controller 240 and the elements in the controller 240 are functional blocks that are realized by a CPU (Central Processing Unit) in the macro base station 200 executing the computer program stored in the storage device 230 and functioning in accordance with the computer program.

1(4)-3. Configuration of Small Base Station

Figure 11:
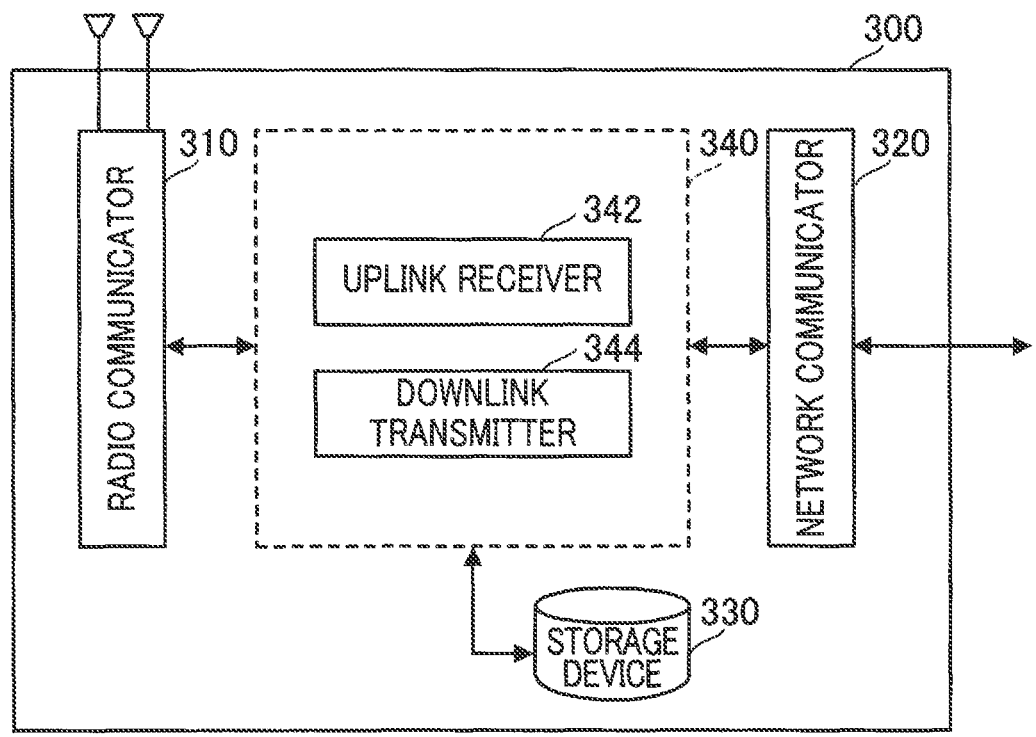
FIG. 11 is a block diagram showing a configuration of a small base station according to the first embodiment.

FIG. 11 is a block diagram showing a configuration of the small base station 300 according to the first embodiment. The small base station 300 includes a radio communicator 310, a network communicator 320, a storage device 330, and a controller 340. The radio communicator 310 is an element for executing radio communication with the user terminal 100 and includes a transmission/reception antenna, a reception circuit, and a transmission circuit. The network communicator 320 is an element for executing communication with other nodes in the network NW, including the macro base station 200, and transmits and receives signals to and from other nodes. The storage device 330 stores information relating to communication control and a later-described computer program.

The controller 340 includes an uplink receiver 342 and a downlink transmitter 344. The uplink receiver 342 receives uplink signals transmitted from the user terminal 100. The downlink transmitter 344 transmits downlink signals to the user terminal 100. A downlink signal transmitted by the downlink transmitter 344 may include information (control signal) relating to scheduling that is supplied from the transmission/reception controller 244 in the macro base station 200. The controller 340 and the elements in the controller 340 are functional blocks that are realized by a CPU (Central Processing Unit) in the small base station 300 executing the computer program stored in the storage device 330 and functioning in accordance with the computer program.

1(5)-1. Advance Notification Operation

Figure 12:
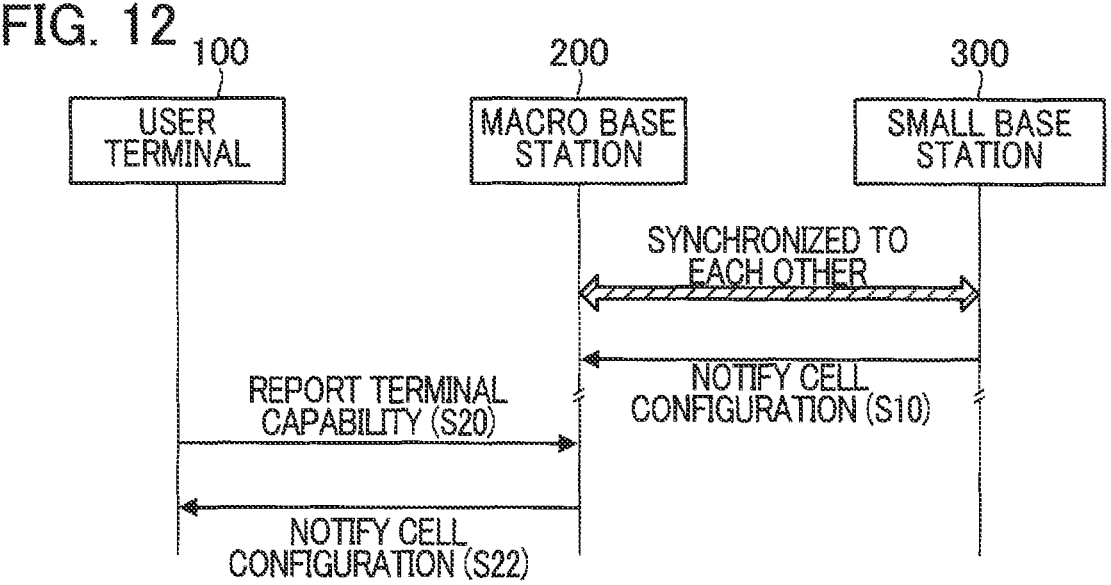
FIG. 12 is a flow diagram of an advance notification operation.

FIG. 12 is a flow diagram illustrating a notification operation of each node to be executed prior to transmission or reception of radio signals. The macro base station 200 and the small base station 300 are synchronized to each other. The small base station 300 notifies the macro base station 200, along with the UL-DL configuration number that the small base station 300 (small cell C2) uses for transmitting and receiving radio signals, information indicating that the small base station 300 (small cell C2) supports the extended subframe E in a case where the small base station 300 supports the extended subframe E (S10).

The user terminal 100 reports information (terminal capability) indicating that the user terminal 100 supports the extended subframe E to the macro base station 200 (S20). The aforementioned terminal capability may be reported using an extended subframe support bit included in the control signal, or may be reported as a standard number (e.g., LTE standard release number) to which the user terminal 100 conforms. The macro base station 200 may preferably recognize a user terminal 100 that does not perform the aforementioned report as a "terminal not supporting the extended subframe (legacy terminal)".

Upon receiving a report that indicates that the user terminal 100 supports the extended subframe E, the macro base station 200 transmits the UL-DL configuration number of the secondary cell and information indicating that the secondary cell supports the extended subframe E to the user terminal 100 using higher layer signaling (e.g., a Radio Resource Control (RRC) message) (S30). In a case where the primary cell is a TD-LTE serving cell as well, the UL-DL configuration number of the primary cell is transmitted using system information (e.g., System Information Block type 1 (SIB1)). Also, in a case where the primary cell supports the extended subframe E as well, the macro base station 200 may transmit information indicating that the primary cell supports the extended subframe E using broadcast information.

1(5)-2. Transmission and Reception Operations

In the following, transmission and reception operations executed by the small base station 300 and the user terminal 100 that support the extended subframe E will be described. Because the transmission and reception operations in the downlink subframe D and in the special subframe S are similar to the conventional operations, transmission and reception operations in the extended subframe E will be described.

1(5)-2-a. Operation of Extended Subframe Non-Supporting Terminal

A user terminal 100a that does not support the extended subframe E executes an operation, in the extended subframe E, that is the same as the operation in the conventional uplink subframe U. In other words, the user terminal 100a recognizes subframes corresponding to the extended subframes E in FIG. 8 as the conventional uplink subframes U based on the UL-DL configuration, of the cell C formed by the base station eNB, which is notified by the base station eNB. Specifically, in a case where a downlink control signal (L1/L2 control signal) included in a downlink subframe D that precedes an extended subframe E by a predetermined number of subframes instructs uplink transmission in the extended subframe E or in a case where uplink transmission is instructed by higher layer signaling, such as RRC, in advance, the uplink transmitter 134 of the user terminal 100a transmits uplink signals to the small base station 300 in accordance with the instruction. On the other hand, the uplink transmitter 134 of the user terminal 100a does not transmit uplink signals in a case where the aforementioned downlink control signal or higher layer signaling, such as RRC, does not instruct uplink transmission.

1(5)-2-b. Operation of Extended Subframe Supporting Terminal

A user terminal 100b that supports the extended subframe E executes, in the extended subframe E, uplink transmission or downlink reception in a small cell C2 according to a downlink control signal (e.g., L1/L2 control signal transmitted in a physical downlink control channel (PDCCH)) or higher layer signaling (e.g., RRC message).

Figure 13:
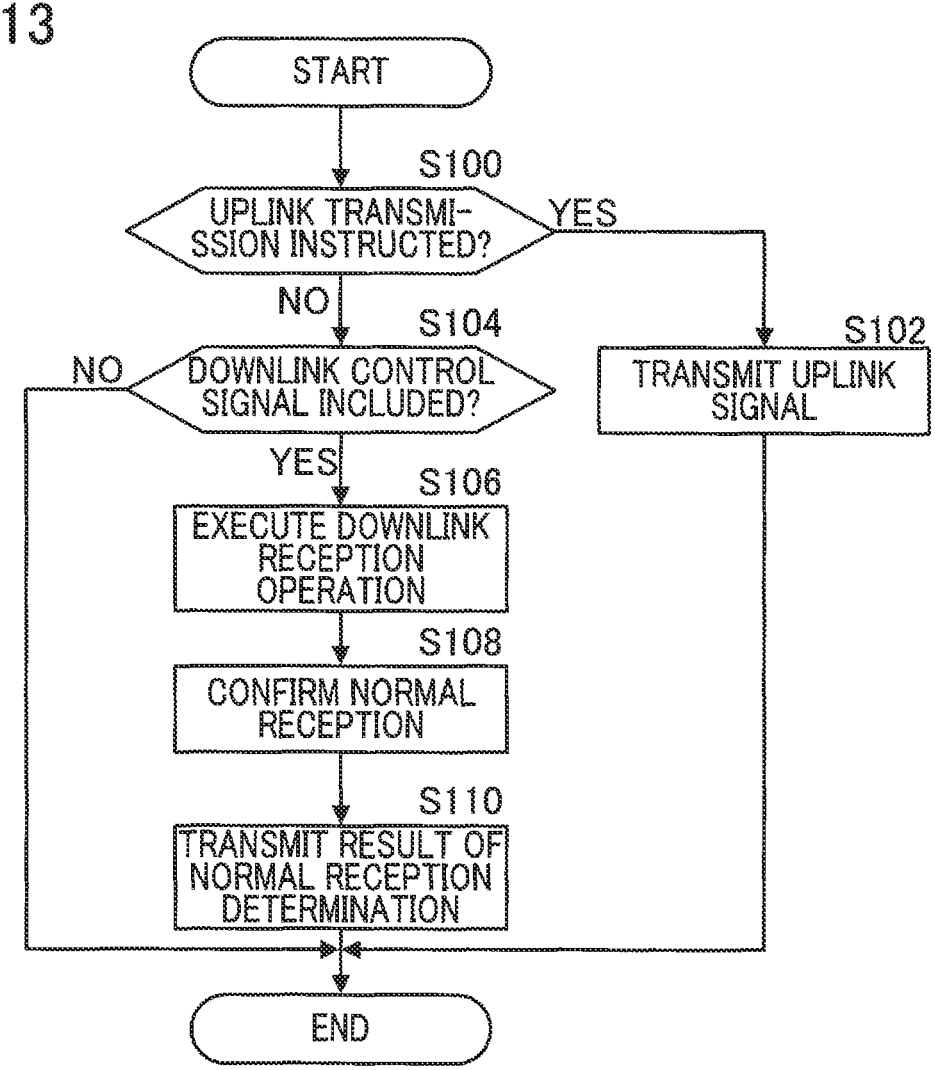
FIG. 13 is a flowchart illustrating an operation of a user terminal in an extended subframe.

FIG. 13 is a flowchart illustrating an operation, of the user terminal 100b, executed in the extended subframe E. The uplink transmitter 134 in the user terminal 100b transmits, in a case where uplink transmission is instructed in the extended subframe E (S100; YES), an uplink signal to the small base station 300 following the instruction (S102). The aforementioned uplink transmission may be instructed by using a downlink control signal included in the downlink subframe D that is located before the extended subframe E by a predetermined number of subframes or may be instructed in advance by higher layer signaling, such as RRC.

On the other hand, in a case where the aforementioned downlink control signal or higher layer signaling does not instruct uplink transmission (S100; NO), the downlink receiver 132 in the user terminal 100b attempts to detect a downlink control signal addressed to the user terminal 100b, thereby to determine whether or not a downlink control signal is included in the extended subframe E (S104). In a case where it is determined that the aforementioned downlink control signal is not included (S104; NO), the operation in the extended subframe E ends. In a case where it is determined that the aforementioned downlink control signal is included (S104; YES), the downlink receiver 132 executes a downlink reception operation according to the downlink control signal (S106).

After step S106, the downlink receiver 132 determines whether the downlink signal has been successfully received, and supplies the determination result to the uplink transmitter 134 (S108). The uplink transmitter 134 transmits a determination result to the macro base station 200 as an HARQ feedback (Ack or Nack) (S110). In a case where the determination result indicates a signal reception abnormality, downlink re-transmission is executed based on HARQ.

The timing at which the HARQ feedback is transmitted may preferably match the transmission timing of a case where the extended subframe E is a downlink subframe D or a special subframe S. Specifically, in a case where the primary cell is an FDD cell, the user terminal 100b transmits the HARQ feedback in an uplink subframe U of the primary cell that is the fourth subframe after the extended subframe E in which the DL signal addressed to the user terminal 100b is detected. In a case where the primary cell is a TDD cell, the user terminal 100b transmits the HARQ feedback in an uplink subframe U of the primary cell that is the k-th subframe after the extended subframe E in which the DL signal addressed to the user terminal 100b is detected. Here, the aforementioned parameter k is a value uniquely determined by the UL-DL configuration of the primary cell and the number of the subframe in which the DL signal has been detected.

The transmission timing of the HARQ feedback according to the above-mentioned configuration matches the existing transmission timing of the HARQ feedback in one of the carrier aggregation among the FDD cells, the carrier aggregation among the TDD cells, and the carrier aggregation among the FDD cell and the TDD cell. Accordingly, it is possible to avoid the scheduling by the base station eNB becoming complicated and to simplify the implementation of the user terminal 100 compared with a configuration in which a new transmission timing of the HARQ feedback is defined. Such transmission timings are designated in a timing table to be stored in the storage device 120.

1(6). Configuration Specific to Extended Subframe

1(6)-1. Reference Signal

The configuration of a downlink reference signal transmitted from the downlink transmitter 344 in the extended subframe E is different from that of a reference signal transmitted from the downlink transmitter 344 in the downlink subframe D.

In an ordinary downlink subframe D, a cell-specific reference signal (CRS) specific to the small cell C2 formed by the small base station 300 is transmitted. More specifically, the cell-specific reference signals are transmitted in predetermined OFDM symbols and subcarriers in every resource block included in the downlink subframe D. As will be understood from the above, the cell-specific reference signals are transmitted across the whole frequency band (subband SB), which is used, and in all the downlink subframes D, and this becomes one cause of large interference to the neighboring subband, as was described before with reference to FIG. 7.

In the extended subframe E of the present embodiment, the downlink transmitter 344 transmits a cell-specific reference signal of a volume smaller than the transmission volume of a cell-specific reference signal in the downlink subframe D. For example, the downlink transmitter 344 may limit the number of the frequency bands in which the cell-specific reference signal is to be transmitted (subcarriers used for transmission are limited), may limit the number of periods in which the cell-specific reference signal is to be transmitted (OFDM symbols to be transmitted are limited), or may combine both of the above. Also, the downlink transmitter 344 may stop transmitting the cell-specific reference signal in the extended subframe E. Stoppage of transmitting the cell-specific reference signal is a concept included in the aforementioned "transmitting a cell-specific reference signal of a volume smaller than the transmission volume of a cell-specific reference signal in the downlink subframe D".

Figure 14:
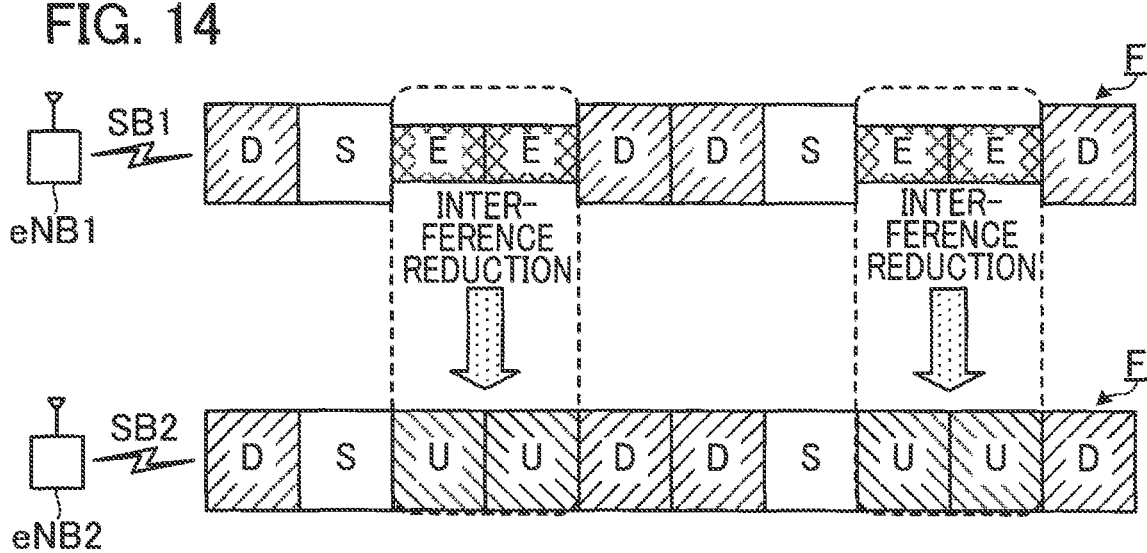
FIG. 14 is a diagram illustrating reduction in the interference that occurs between subbands.

As shown in FIG. 14, the downlink transmitter 344 transmits terminal-specific reference signals (e.g., DMRS) specific to the user terminal 100 in the extended subframe E. The width in the vertical axis of the subframe SF corresponds to the width of the transmission frequency bandwidth. The terminal-specific reference signal is variable in the transmission frequency bandwidth. Accordingly, the terminal-specific reference signal is transmitted using a frequency bandwidth that is smaller than the frequency bandwidth used for transmitting the cell-specific reference signal in the downlink subframe D. The downlink receiver 132 in the user terminal 100 can execute a downlink reception operation (demodulation/decoding of downlink control signals and downlink data signals) using the terminal-specific reference signal without using the cell-specific reference signal. The downlink transmitter 344 may transmit a control signal using an enhanced physical downlink control channel (E-PDCCH) in the extended subframe E.

As described above, as a result of reducing the transmission volume (transmission frequency band, transmission period, and the like) of the cell-specific reference signal in the extended subframe E, it is possible to reduce interference that the extended subframe E transmitted in the subband SB1 gives to a subframe SF (uplink subframe U, in particular) transmitted in the neighboring subband SB2. Also, although the transmission volume of the cell-specific reference signal is reduced, a necessary reception operation remains executable by using the terminal-specific reference signal.

1(6)-2. Transmission Power Control

The downlink transmitter 344 in the small base station 300 may preferably reduce the downlink transmission power in the extended subframe E below the downlink transmission power in the downlink subframe D. For example, the downlink transmitter 344 may employ 30 dBm (or 46 dBm) as the downlink transmission power in the downlink subframe D, whereas the downlink transmitter 344 may employ 23 dBm (transmission power that is the same as the uplink maximum transmission power) as the downlink transmission power in the extended subframe E.

During the downlink subframe D, a set of reference signals used for operations (e.g., measurement of reception power, cell detection, and maintaining synchronization) necessary for establishing a radio connection and maintaining radio communication needs to be transmitted. Because the reference signals directly affect the cell size and the number of terminals that can be served, changing the transmission parameters such as transmission power is difficult from the viewpoint of implementation. On the other hand, because the set of reference signals need not be transmitted in the extended subframe E, the transmission parameter can be changed in a more flexible manner in the extended subframe E.

Accordingly, reducing the transmission power in the extended subframe E as described above enables the reduction in the interference that the extended subframe E imparts to the neighboring cell (same subband).

1(7). Effect of Present Embodiment

According to the aforementioned present embodiment, the new extended subframe E is introduced. The extended subframe E can be used for either the downlink transmission or uplink transmission according to the scheduling by the base station eNB (the small base station 300 controlled by the macro base station 200, in the present embodiment). Accordingly, the radio resource allocation for uplink communication and downlink communication in time division duplex can be executed more flexibly compared with a configuration in which the usages (types of subframes D, U, and S) of all the subframes SF are fixed.

Dynamic TDD is introduced in release 12 of the LTE standard in order to flexibly change the UL-DL configuration (radio resource allocation) in the radio frame F. Although the UL-DL configuration can be changed by PDCCH (L1/L2 control signal) in the dynamic TDD, there is a problem in that more control resources are consumed in order to achieve this. According to the configuration of the present embodiment, because the extended subframe E is instructed to be either for uplink transmission or downlink transmission, and this is achieved by simple scheduling, overhead for control can be reduced compared with the dynamic TDD.

Furthermore, the present embodiment is suited in an environment in which a terminal that supports the extended subframe E (compatible user terminal 100b) and a terminal that does not support the extended subframe E (incompatible user terminal 100a) co-exist. The existing UL-DL configurations are transmitted to both the incompatible user terminal 100a and the compatible user terminal 100b by using the system information of the cell C. In addition, application of the extended subframe E is instructed to the compatible user terminal 100b by using the terminal-specific higher layer signaling.

The base station eNB does not execute downlink transmission to the compatible user terminal 100b and instructs the uplink transmission as necessary at timings when any of the user terminals 100 (incompatible user terminal 100a or, compatible user terminal 100b) needs to perform the uplink transmission. On the other hand, the base station eNB executes the downlink transmission to the compatible user terminal 100b at timings when none of the user terminals 100 needs to perform the uplink transmission. Thus, according to the configuration of the present embodiment, the radio resources of the TD-LTE cell can be flexibly utilized according to the ratio of the compatible user terminals 100b relative to all the user terminals 100 while the radio communication of the incompatible user terminal 100a is secured.

2. Second Embodiment

A second embodiment of the present invention will be described hereinafter. In the embodiments exemplified hereinafter, elements whose effect and function are substantially the same as those in the first embodiment are provided with the same reference signs that are referenced in the above description, and description thereof will be omitted as appropriate.

In order to support a terminal not compatible with the extended subframe E, in TD-LTE, control functions (such as cell detection, mobility control, measurement control) necessary for establishing a radio connection or maintaining radio communication needs to be realized by the downlink subframe D and the special subframe S. As a result, a configuration for realizing the aforementioned control functions is not essential in the extended subframe E. Accordingly, in the second embodiment, a cell application using virtual cell identifiers VCID with respect to the extended subframe E is adopted.

2(1). Virtual Cell Identifier and Virtual Cell

A virtual cell identifier VCID is an identifier that corresponds to one or more base stations eNB (preferably two or more base stations eNB). Similar to the physical cell identifier PCI, the virtual cell identifier VCID corresponds to a scrambling code that is used for scrambling a radio signal such as a reference signal and for generating a code sequence.

More specifically, one or more base stations eNB virtually forms a single virtual cell VC corresponding to a single virtual cell identifier VCID. "To virtually form the virtual cell VC" means that one or more base stations eNB that correspond to the virtual cell VC transmit radio signals that are scrambled by a scrambling code corresponding to the virtual cell VC (virtual cell identifier VCID). A user terminal 100 descrambles the received radio signal from the base stations eNB (i.e., from the virtual cell VC) using the scrambling code, so as to obtain a desired signal.

As can be understood from the above description, the user terminal 100 needs to know the virtual cell identifier VCID (scrambling code) corresponding to the virtual cell VC prior to receiving a radio signal to be transmitted in the virtual cell VC. The virtual cell identifier VCID is transmitted to the user terminal 100 from a cell C (physical cell) to which the user terminal 100 is connected. The virtual cell identifier VCID is preferably transmitted from the primary cell to the user terminal 100, but may be transmitted to the user terminal 100 in the downlink subframe D of the secondary cell.

Two or more virtual cells VC (virtual cell identifiers VCID) may be assigned to a single base station eNB. That is, the base station eNB can transmit radio signals using virtual cell identifiers VCID that are different for respective user terminals 100.

2(2). Application of Extended Subframe Using Virtual Cell Identifier

Figure 15:
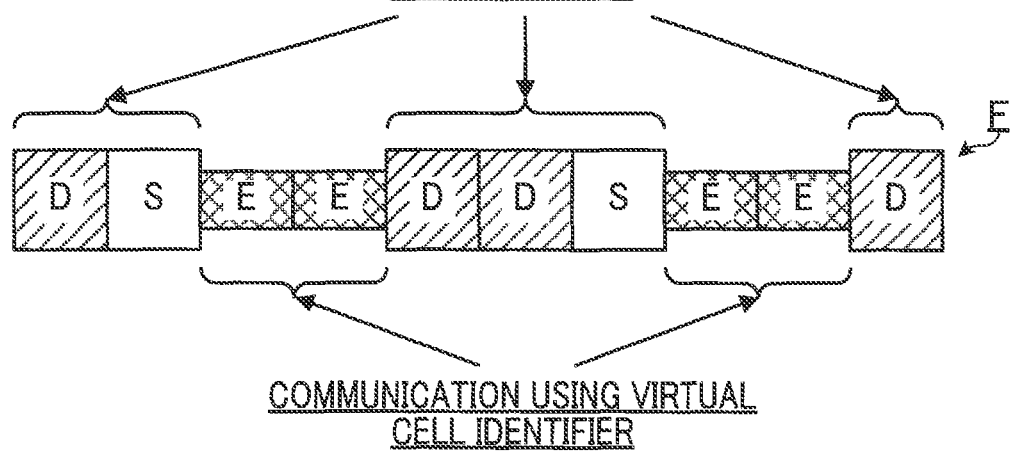
FIG. 15 is a diagram describing an application of the extended subframe using a virtual cell identifier.

An application of the extended subframe using the virtual cell identifier of the present embodiment will be described with reference to FIG. 15. The transmission/reception controller 244 in the macro base station 200 controls the user terminal 100 to execute cell-specific communication using the physical cell identifier PCI, similarly to the above-described application, in the downlink subframe D and in the special subframe S. The transmission/reception controller 244 controls the user terminal 100 to execute UE-specific communication using the virtual cell identifier VCID in the extended subframe E.

The transmission/reception operation of the user terminal 100 during the downlink subframe D and the special subframe S is similar to the operation described above. In receiving a downlink signal in the extended subframe E, the downlink receiver 132 in the user terminal 100 executes the reception operation using the virtual cell identifier VCID notified by the macro base station 200 (S106 in FIG. 13).

In transmitting an uplink signal in the extended subframe E, the uplink transmitter 134 in the user terminal 100 executes the transmission operation using the physical cell identifier PCI instead of using the virtual cell identifier VCID (S102 in FIG. 13).

2(3). Effect of Present Embodiment

Figure 16:
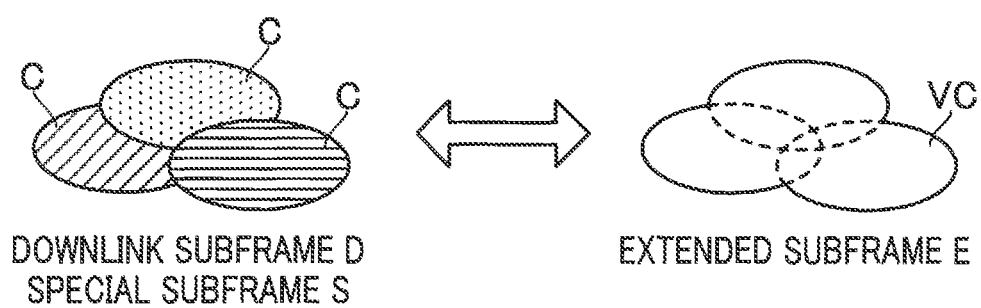
FIG. 16 is a diagram describing an effect of a second embodiment.

According to the above configuration, cell-specific communication is executed in which the virtual cell identifier VCID is not used in the downlink subframe D and the special subframe S, and UE-specific communication is executed using the virtual cell identifier VCID in the extended subframe E, as shown in FIG. 16. Accordingly, by stopping the downlink transmission in the extended subframe E, the operation can flexibly fall back to the cell application in which only the cell-specific communication is executed without performing UE-specific communication (cell application in which the virtual cell identifier VCID is not used).

An example of a specific utilization method of the above configuration is as follows. In a case where two or more base stations eNB configure the virtual cell VC, it is possible that coordinated multipoint transmission/reception (CoMP) is executed in which two or more base stations eNB (transmission points) communicate with one user terminal 100 in a coordinated manner in the extended subframe E, and that normal communication is executed in which a base station eNB and the user terminal 100 correspond one to one in the other subframes SF.

3. Third Embodiment

A discovery signal used for the user terminal 100 to discover a cell C is proposed in the LTE standard, Release 12. The discovery signal is defined so as to be transmitted from a base station eNB in the downlink subframe D and in the special subframe S. Naturally, transmission of the discovery signal in the extended subframe E is not defined in the LTE standard, Release 12 or earlier, in which the extended subframe E, which is newly proposed in the present invention, is not referred to.

3(1). Transmission of Discovery Signal in Extended Subframe

Figure 17:
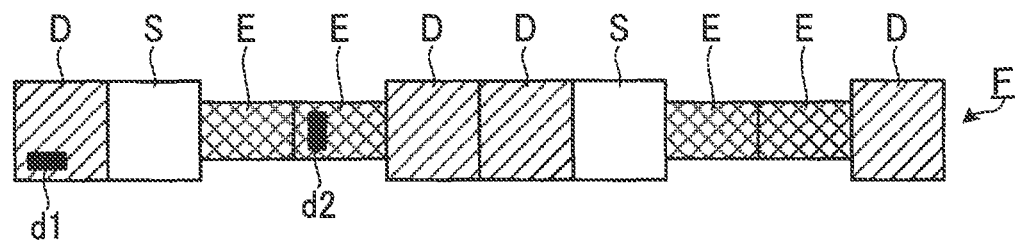
FIG. 17 is a diagram illustrating discovery signals.

Transmission of the discovery signal d in a third embodiment will be described with reference to FIG. 17. In the present embodiment, a first discovery signal d1 is to be transmitted in the downlink subframe D and/or in the special subframe S, and a second discovery signal d2 is to be transmitted in the extended subframe E.

In the third embodiment, it is assumed that UE-specific communication (communication using the virtual cell identifier VCID) is executed in the extended subframe E, as in the second embodiment. The first discovery signal d1 is a cell-specific radio signal used for detecting a cell C that corresponds to a base station eNB that transmits the first discovery signal d1, as in the conventional case. The second discovery signal d2 to be transmitted in the extended subframe E is a virtual cell-specific radio signal used for detecting a virtual cell VC that corresponds to one or more base stations eNB that transmit the second discovery signal d2.

The discovery signal d of the present embodiment does not have to include the synchronization signal or the cell-specific reference signal. The discovery signal d may be configured in a way similar to CSI-RS, for example. This is because the discovery signal d does not need to support the synchronization function or the mobility function. The conventional CSI-RS is transmitted over the entire band of the serving cell, but the discovery signal d may be transmitted in only a portion of the band (e.g., a central partial band, as in FIG. 17) when the discovery signal d is configured in a way similar to the CSI-RS. This is because the purpose of transmitting the discovery signal d is cell detection, and is not channel quality (CSI) measurement. According to this configuration, the interference to a neighboring band in a new extended subframe E due to the discovery signal d can be reduced.

The downlink receiver 132 in the user terminal 100 can separately detect and receive the first discovery signal d1 and the second discovery signal d2. Also, the uplink transmitter 134 can separately report a discovery result with the first discovery signal d1 and a discovery result with the second discovery signal d2.

It is of note that the present embodiment may employ a configuration of using a transmission point (TP) the cell C.

3(2). Effect of Present Embodiment

According to the above-described configuration, because the ordinary cell C and the virtual cell VC can be detected separately and the discovery results are reported separately, the selection of the cell C and the selection of the virtual cell VC can be performed more appropriately. Also, a user terminal 100 that does not support the extended subframe E need only execute a detection operation using only the first discovery signal d1, as in a conventional system, and therefore the overhead does not increase even if the second discovery signal d2 is transmitted.

4. Fourth Embodiment

It is defined, in Releases 8 to 12 of the LTE standard, that the user terminal 100 is transitioned to a discontinuous reception (DRX) state in which reception operations are executed discontinuously in a case where the downlink transmission is not executed over a predetermined period.

Figure 18:
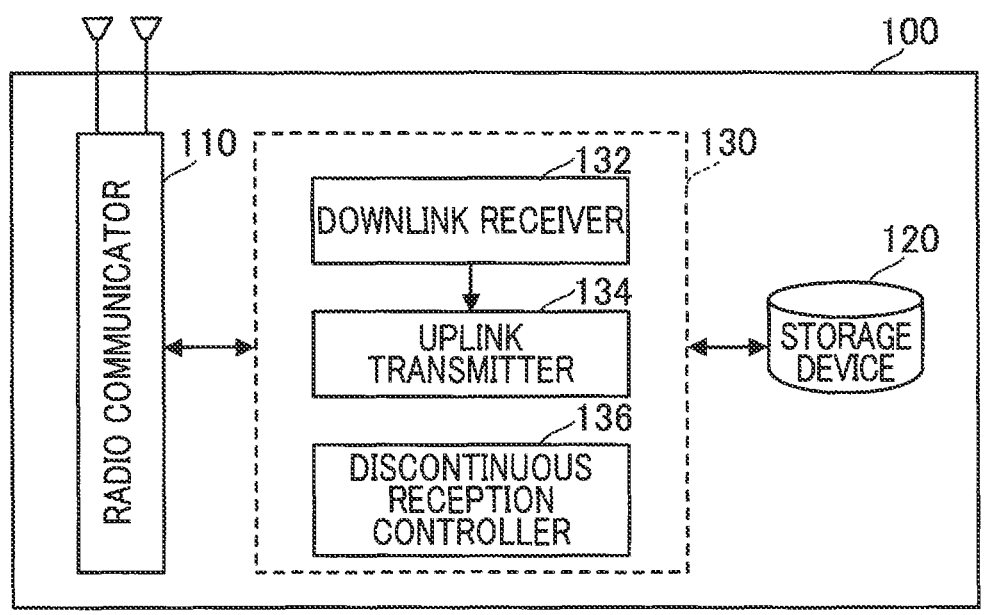
FIG. 18 is a block diagram showing a configuration of a user terminal according to a fourth embodiment.

A controller 130 of a user terminal 100 of a fourth embodiment includes a discontinuous reception controller 136, as shown in FIG. 18. The discontinuous reception controller 136 determines whether or not discontinuous reception state transition is needed based on the number of subframes SF (PDCCH subframes) that contain PDCCH. More specifically, when the PDCCH subframes in which a data signal addressed to the user terminal 100 is not transmitted are counted and the counted value reaches a predetermined threshold or more, the discontinuous reception controller 136 determines that the user terminal 100 needs to transition to the discontinuous reception state.

According to the definition of 3GPP TS 36.321, the downlink subframe D and the special subframe S correspond to the PDCCH subframes. Naturally, it is undefined whether or not the extended subframe E, which is newly proposed here, corresponds to the PDCCH subframe. Hereinafter, two different patterns of how the extended subframe E in the discontinuous reception control is handled will be described.

4(1)-1. Operation of Discontinuous Reception Controller (Pattern 1)

In Pattern 1, the discontinuous reception controller 136 does not count the extended subframe E as the PDCCH subframe, regardless of whether or not a data signal addressed to the user terminal 100 is transmitted in the extended subframe E. The downlink receiver 132 executes reception and decoding of PDCCH (or E-PDCCH) in the extended subframe E.

4(1)-2. Effect of Configuration of Pattern 1

According to the aforementioned configuration of Pattern 1, the method of counting the PDCCH subframes is the same between a user terminal 100a that does not support the extended subframe E and a user terminal 100b that supports the extended subframe E. Accordingly, even if the new extended subframe E is introduced, a conventional discontinuous reception control algorithm is still applicable without modification. Also, because the assignment of the uplink transmission and the downlink transmission in the extended subframe E does not influence the discontinuous reception control, the assignment can be flexibly performed.

4(2)-1. Operation of Discontinuous Reception Controller (Pattern 2)

In Pattern 2, the discontinuous reception controller 136 counts the extended subframe E as the PDCCH subframe in a case where the downlink receiver 132 attempts to receive the PDCCH (or E-PDCCH) in the extended subframe E. In other words, the discontinuous reception controller 136 does not count the extended subframe E as the PDCCH subframe in a case where the user terminal 100 executes uplink transmission in the extended subframe E.

4(2)-2. Effect of Configuration of Pattern 2

According to the aforementioned configuration of Pattern 2, the number of subframes SF that are counted as the PDCCH subframe increases compared with the configuration of Pattern 1. Accordingly, the user terminal 100 transitions to the discontinuous reception state at an earlier timing, and as a result the power consumption of the user terminal 100 can be reduced more.

5. Modifications

The above embodiment can be modified in various ways. The following illustrates specific modification modes. Any two or more modes selected from among the above embodiment and following modifications can be appropriately combined as long as there are no mutual inconsistencies.

5(1). Modification 1

In a case where transmission of an uplink control signal (e.g., SRS, PRACH, or Periodic CSI/SR) that is semi-statically configured based on the control through the RRC layer is scheduled in a subframe SF, the user terminal 100 need not recognize the subframe SF as the extended subframe E. In this case, the user terminal 100 may recognize the subframe SF as the uplink subframe U. Also, the user terminal 100 need not attempt detection of the downlink control signal in the subframe SF in which transmission of an uplink control signal (e.g., SRS, PRACH, or Periodic CSI/SR) that is semi-statically configured based on the control through the RRC layer is scheduled. Also, the user terminal 100 does not generate a HARQ feedback bit corresponding to the subframe that is not notified as the extended subframe E.

5(2). Modification 2

In the first embodiment, the application of the extended subframe E is implicitly notified from the base station eNB (the small base station 300 controlled by the macro base station 200) to the user terminal 100 (i.e., notified as uplink or downlink scheduling information). However, the base station eNB may explicitly notify the user terminal 100 that a certain subframe SF is the extended subframe E. Although the notification may be performed by the small base station 300, the notification is preferably performed by the macro base station 200 that controls the small base station 300. The notification is performed by using higher layer signaling such as an RRC message.

The downlink receiver 132 of the user terminal 100 attempts to detect a downlink control signal in the subframe SF for which the user terminal has been notified as being the extended subframe E. When the downlink control signal is detected, the downlink reception operation is executed according to the downlink control signal. On the other hand, the user terminal 100 does not have to attempt to detect a downlink control signal in a subframe SF for which the user terminal has not been notified as being the extended subframe E. Also, the user terminal 100 does not generate an HARQ feedback bit corresponding to the subframe for which the user terminal has not been notified as being the extended subframe E.

5(3). Modification 3

In Modification 1 in which the base station eNB explicitly notifies the extended subframe E, the base station eNB may further notify the user terminal 100 that the extended subframe E having a specific subframe number is to be semi-persistently used for downlink transmission.

The downlink receiver 132 in the user terminal 100 executes a downlink reception operation in the extended subframe E for which a notification that it is to be used for downlink transmission has been given. Detection of the downlink control signal prior to the aforementioned reception operation may be executed, or does not have to be executed.

5(4). Modification 4

In the second embodiment, the transmission/reception controller 244 in the macro base station 200 may further configure a virtual cell identifier VCID (VCID2) for use in the downlink subframe D and the special subframe S in addition to the virtual cell identifier VCID (VCID1) for the extended subframe E. In this case, the transmission/reception controller 244 controls the user terminal 100 so as to execute UE-specific communication using the virtual cell identifier VCID2 in the downlink subframe D and the special subframe S.

5(5). Modification 5

In the second embodiment, the uplink transmitter 134 in the user terminal 100 may report the channel state information (CSI) separately for the downlink subframe D and special subframe S in which cell-specific communication is executed, and for the extended subframe E in which the UE-specific communication is executed. Because the aforementioned cell-specific communication and UE-specific communication differ from each other with respect to the radio communication environment, according to the configuration of the present modification, more appropriate link adaptation according to each of the communication environments can be realized. Reporting of the aforementioned channel state information may be periodically executed, or may be non-periodically executed.

5(6). Modification 6

In the third embodiment, notification of the reception timing of the second discovery signal d2 to the user terminal 100 may be performed by higher layer signaling, such as RRC messages, or may be performed by MAC signaling or PHY (L1/L2) signaling. In a case where the notification is performed by higher layer signaling, it is preferable that the user terminal 100 is notified of the transmission periodicity and the transmission timing offset of the semi-static second discovery signal d2. On the other hand, in a case where the notification is performed by MAC signaling or PHY signaling, it is preferable that the detection timing of the second discovery signal d2 is dynamically instructed to the user terminal 100.

In the aforementioned configuration of the present modification (particularly in the case of being configured by the higher layer signaling), downlink reception (reception of the second discovery signal d2) and uplink transmission could be instructed with respect to a single extended subframe E at the same time due to a scheduling error on the network NW side or a detection error on the user terminal 100 side. When such an event occurs, it is preferable that the user terminal 100 executes reception of the second discovery signal d2 with priority. This is because, as a result of the user terminal 100 not executing uplink transmission, collision between the uplink signal and the second discovery signal d2 is avoided. As a result, degradation in detection accuracy of the second discovery signal d2 in another user terminal 100 is avoided.

5(7). Modification 7

In the aforementioned embodiments, carrier aggregation is adopted in the cellular radio communication system CS, and the small base station 300 serving as the secondary cell transmits the extended subframe E. However, a configuration may be adopted in which the macro base station 200 serving as the primary cell transmits the extended subframe E. In this configuration, at least one uplink subframe U may preferably be included in the radio frame F in order to secure feedback from the user terminal 100. In other words, it is preferable that an UL-DL configuration including the extended subframe E and the uplink subframe U is adopted in the primary cell.

5(8). Modification 8

The user terminal 100 is a freely selected device that is capable of radio communication with the macro base station 200 and the small base station 300. The user terminal 100 may be a cellular phone terminal such as a feature phone or a smartphone, may be a desktop personal computer, may be a notebook personal computer, may be an UMPC (Ultra-Mobile Personal Computer), may be a portable game machine, or may be another radio terminal.

5(9). Modification 9

Functions that the CPU executes in respective elements (user terminal 100, macro base station 200, and small base station 300) in the cellular radio communication system CS may be executed by hardware instead of the CPU, or may be executed by a programmable logic device such as an FPGA (Field Programmable Gate Array) or a DSP (Digital Signal Processor).

DESCRIPTION OF REFERENCE SIGNS 100 (100a, 100b) user terminal
110 radio communicator
120 storage device
130 controller
132 downlink receiver
134 uplink transmitter
136 discontinuous reception controller
200 macro base station
210 radio communicator
220 network communicator
230 storage device
240 controller
242 uplink receiver
244 transmission/reception controller
246 downlink transmitter
300 small base station
310 radio communicator
320 network communicator
330 storage device
340 controller
342 uplink receiver
344 downlink transmitter
C cell
C1 macro cell
C2 small cell
CS cellular radio communication system
D downlink subframe
E extended subframe
F radio frame
eNB (eNB1, eNB2) base station
NW network
PCI physical cell identifier
S special subframe
SB (SB1, SB2) subband
SF subframe
U uplink subframe
VC virtual cell
VCID virtual cell identifier
d discovery signal
d1 first discovery signal
d2 second discovery signal

The invention claimed is:

1. A user terminal that communicates with a primary cell and a secondary cell by radio, comprising:

a receiver that receives a higher layer signaling; and
a controller that sets:
- a first communication usage of a first radio communication resource, which is divided into periods of communication usage, to be used in the primary cell and
- a second communication usage, which is divided into periods of communication usage, of a second radio communication resource to be used in the secondary cell, based on the higher layer signaling, wherein, based on the higher layer signaling, the controller uses the first radio communication resource and the second communication resource as a radio communication resource including a period of communication usage of the respective periods of communication usage that is neither a period for transmission of a downlink signal nor a period for transmission of an uplink signal.

2. The user terminal according to claim 1,
wherein, in a case where, based on the higher layer signaling, the controller sets the second communication usage of the second radio communication resource used in the secondary cell to be transmission of a downlink signal, and sets the first communication usage of the first radio communication resource used in the primary cell to be transmission of an uplink signal,
the controller feeds back an Acknowledgement (ACK) or a Negative Acknowledgement (NACK) for the second radio communication resource to be used in the secondary cell, by using the first radio communication resource to be used in the primary cell.

3. The user terminal according to claim 1, wherein the receiver executes an operation of receiving a downlink signal in the secondary cell, based on a terminal-specific reference signal that is specific to the user terminal and is transmitted from the secondary cell.

4. A control method for a user terminal that communicates with a primary cell and a secondary cell by radio, comprising:
- receiving a higher layer signaling;
- setting a first communication usage of a first radio communication resource, which is divided into periods of communication usage, to be used in the primary cell; and
- setting a second communication usage of a second radio communication resource, which is divided into periods of communication usage, to be used in the secondary cell, based on the higher layer signaling, wherein, based on the higher layer signaling, the user terminal uses the first radio communication resource and the second communication resource as a radio communication resource including a period of communication usage of the respective periods of communication usage that is neither a period for transmission of a downlink signal nor a period for transmission of an uplink signal.

* * * * *